(12) United States Patent
Adachi

(10) Patent No.: US 6,636,267 B1
(45) Date of Patent: Oct. 21, 2003

(54) LINE INTERPOLATION APPARATUS AND LINE INTERPOLATION METHOD

(75) Inventor: Hajime Adachi, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/533,674

(22) Filed: Mar. 23, 2000

(30) Foreign Application Priority Data

Mar. 24, 1999 (JP) .......................................... 11-078808

(51) Int. Cl.$^7$ ................................................ H04N 7/01
(52) U.S. Cl. ...................................... 348/448; 348/452
(58) Field of Search ................................ 348/448, 452, 348/458, 441, 451, 459; H04N 7/01

(56) References Cited

U.S. PATENT DOCUMENTS

| | | | | |
|---|---|---|---|---|
| 4,730,217 A | * | 3/1988 | Tonge et al. ................ | 348/452 |
| 5,410,356 A | | 4/1995 | Kikuchi et al. | |
| 5,619,273 A | * | 4/1997 | Sugiyama ................... | 348/452 |
| 5,796,437 A | | 8/1998 | Muraji et al. | |
| 6,269,484 B1 | * | 7/2001 | Boussina et al. ........... | 725/151 |

FOREIGN PATENT DOCUMENTS

JP 9-214901 8/1997

OTHER PUBLICATIONS

Kyeong–Hoon Jung, et al., "Dienterlacing using Edge–Based Motion Estimation", Department of Electronics Engineering Seoul National University, Seoul Korea, Aug. 3, 1994, pp. 892–895, XP 000531814.

* cited by examiner

Primary Examiner—Michael H. Lee
(74) Attorney, Agent, or Firm—Sughrue Mion, PLLC

(57) ABSTRACT

A line interpolation apparatus, which converts an interlaced scanning image signal into a progressive scanning image signal, wherein the interlaced scanning image signal is obtained by decoding a signal, for which image compression has been performed by using a motion vector that represents the direction and the distance moved in an image; and wherein, as a line interpolation section, a line interpolation method is determined by using both information obtained from the motion vector and information obtained from differences between a pixel to be interpolated and pixels that, in image fields aligned with the time axis of and preceding and succeeding the image field in which the pixel to be interpolated is located, spatially occupy positions corresponding to that of the pixel to be interpolated.

25 Claims, 5 Drawing Sheets

◯ : PIXEL USED FOR INTERPOLATION

LINE INTERPOLATION APPARATUS AND LINE INTERPOLATION METHOD

BACKGROUND OF THE INVENTION

1. Field of the Invention

The present invention relates to a line interpolation apparatus, for the progressive conversion, into a scanning (a progressive scanning) image signal, of an interlaced scanning image signal, obtained by decoding a signal for which image compression was performed using a vector representing the movement and the direction of movement of an image.

2. Description of the Related Art

To convert an interlaced scanning image into a progressive scanning image, conventionally, motion or lack of motion is detected based on differences in pixel values (a process hereinafter referred to as "motion detection"), and based on the result obtained, interpolation pixels are generated to produce a progressive scanning image.

In this case, when from the result obtained by motion detection it is determined that "an image is stationary", adjacent pixels for field images along the time axis, e.g., upper field images and lower field images, are employed to generate an interpolation pixel that corresponds to an image position midway between the field images.

When, as the result of motion detection, it is determined that "an image is moving", an interpolation pixel is generated using pixels located in the same field image.

According to the conventional line interpolation method, however, since only pixel data in the vicinity of an interpolation pixel that has been generated are employed, a predetermined interpolation process is performed, even though data for the direction or the distance of the overall movement of an image can not be included. Therefore, when deterioration of image quality due to interpolation occurs, correcting the image is difficult.

SUMMARY OF THE INVENTION

To resolve this problem, it is an object of the invention to provide a line interpolation apparatus that includes additional data for the direction and distance of all motion in an image, and can therefore suppress the deterioration of image quality due to interpolation, and to provide a line interpolation method therefor.

To achieve the above object, according to a first aspect of the invention, there is provided a line interpolation apparatus, which converts an interlaced scanning image signal into a progressive scanning image signal, wherein the interlaced scanning image signal is obtained by decoding a signal, for which image compression has been performed, using a motion vector that represents the direction and distance moved in an image; and wherein, as line interpolation means, a line interpolation method is determined by using both information obtained using the motion vector and information obtained by calculating differences between a pixel to be interpolated and pixels that, in image fields aligned with the time axis of and preceding and succeeding the image field in which the pixel to be interpolated is located, spatially occupy positions corresponding to that of the pixel to be interpolated.

According to a second aspect of the invention, there is provided a line interpolation method, for converting an interlaced scanning image signal into a progressive scanning image signal, comprising the steps of: obtaining the interlaced scanning image signal by decoding a signal for which image compression has been performed by using a motion vector to represent the direction and distance moved in an image; and determining a line interpolation method, as line interpolation means, by using both information obtained from the motion vector and information obtained from differences between a pixel to be interpolated and pixels that, in image fields aligned with the time axis of and preceding and succeeding the image field in which the pixel to be interpolated is located, spatially occupy positions corresponding to that of the pixel that is to be interpolated.

DETAILED DESCRIPTION OF THE PREFERRED EMBODIMENT

In accordance with the preferred embodiment of the invention, a line interpolation apparatus will now be explained while referring to the accompanying drawings.

Figure 1:
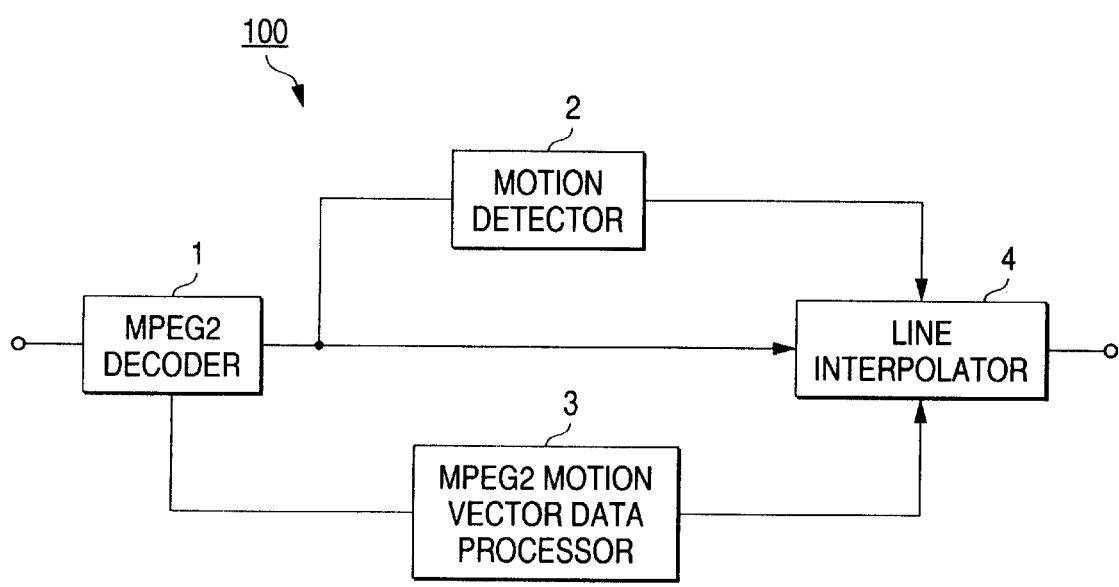
FIG. 1 is a block diagram illustrating the arrangement of a line interpolation apparatus according to one embodiment of the invention.

FIG. 1 is a block diagram illustrating the arrangement of a line interpolation apparatus according to the embodiment of the present invention. As is shown in FIG. 1, a line interpolation apparatus 100 comprises an MPEG2 decoder 1; a motion detector 2; an MPEG2 motion vector data processor 3; and a line interpolator 4.

The line interpolation apparatus 100 receives interlaced scanning image data that have been compressed and stored on a DVD (Digital Versatile Disc), for example. An internationally standardized image compression method, called the MPEG2 method, is employed for the DVD.

According to the MPEG2 method, motion vector data are present in an MPEG2 stream that comprises compressed information.

The arrangement and operation of the line interpolation apparatus 100 will now be described in detail while referring to the drawings.

The MPEG2 decoder 1 receives interlaced scanning image data that are compressed using the MPEG2 method, i.e., image data that are recorded on a DVD, and it decodes and outputs as an interlaced scanning image to the motion detector 2 and the line interpolator 4. The MPEG2 decoder 1 also outputs to the MPEG2 motion vector data processor 3 motion vector data extracted from the MPEG2 stream.

The motion detector 2 employs the interlaced scanning image received from the MPEG2 decoder 1 to compare pixels in adjacent image fields aligned along the time axis, i.e., pixels in adjacent upper image fields or adjacent lower fields (hereinafter referred to as preceding and succeeding image fields), and determines whether the pixels are stationary or moving.

Figure 3:
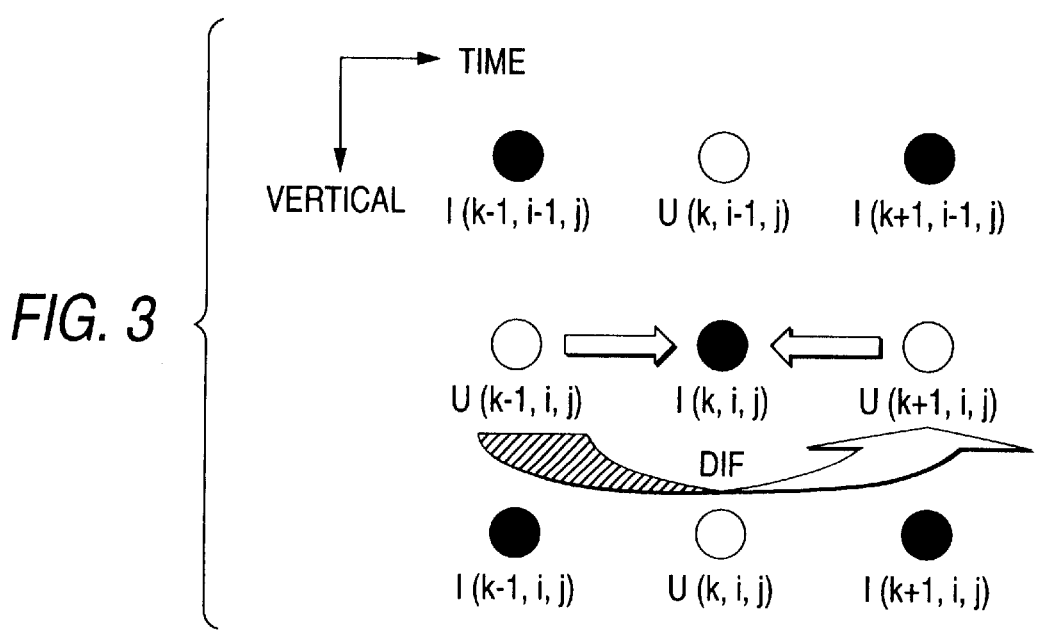
FIG. 3 is a conceptual diagram for explaining the inter-field interpolation process and the motion detection process performed by the line interpolation apparatus in FIG. 1.

The method for detecting the movement of a pixel will now be explained while referring to FIG. 3. In FIG. 3, horizontal displacement, from left to right, corresponds to the direction in which time elapses, and each of the vertically arranged dots represents one pixel. White dots U represent pixel data that were originally present (transmitted by the MPEG2 decoder 1), while black dots I represent interpolation pixel data that have been newly generated by the line interpolator 4, which will be described later. One vertical-dot array represents one image field, while the vertical dot arrangements in FIG. 3 correspond to the vertical direction in the image field.

In FIG. 3, the image field represented by the left vertical array and the image field represented by the right vertical array are both the same image field type, e.g., upper image fields or lower image fields. The image field representing the middle array is a different image field type. When the left and right arrays are upper image fields, the middle array is a lower image field, while when the left and right arrays are lower image fields, the middle array is an upper image field.

Figure 2:
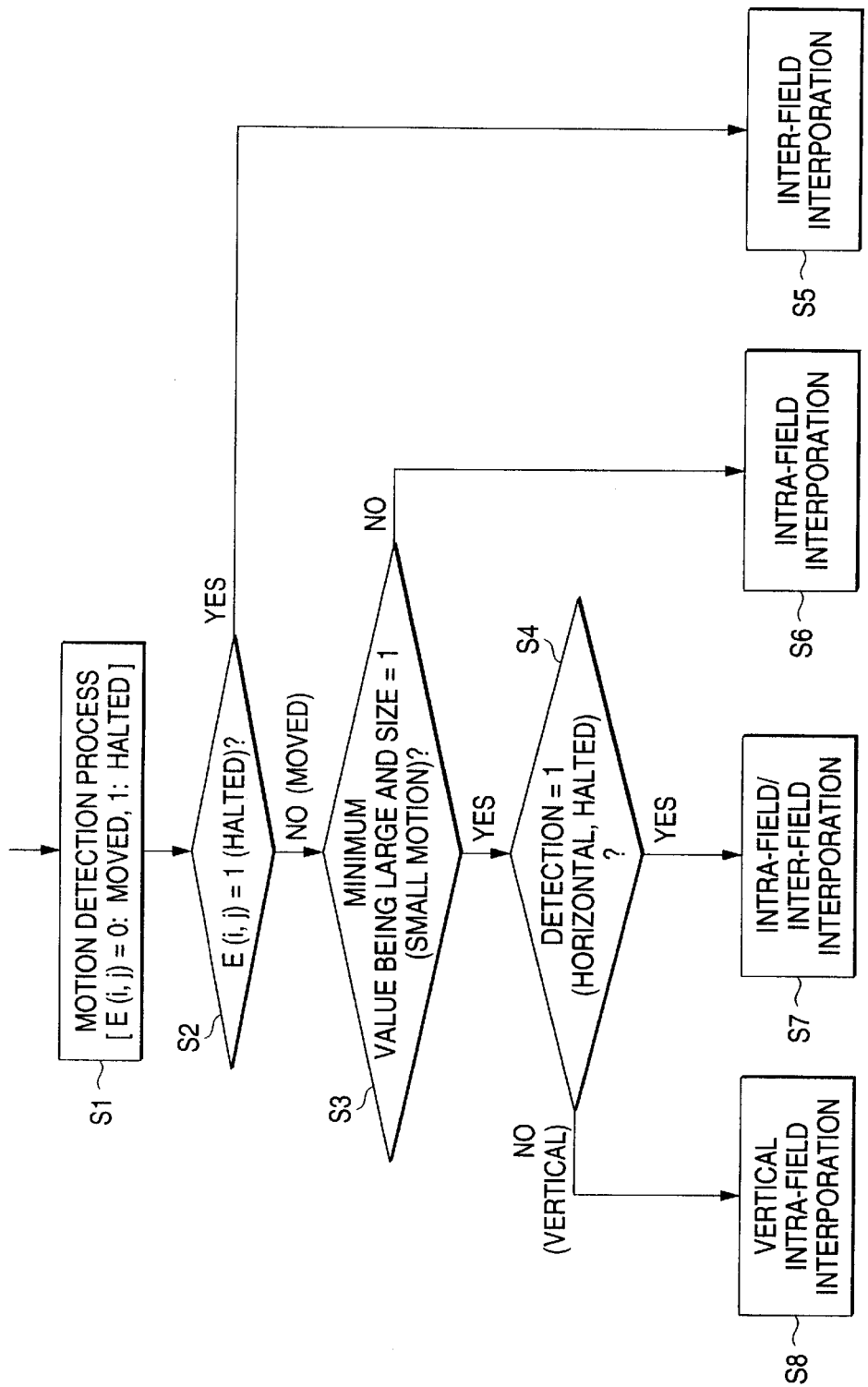
FIG. 2 is a flowchart for explaining the data processing method performed by the line interpolation apparatus in FIG. 1.

The motion detector 2 calculates a difference between a pixel in the image field of the left vertical array, the preceding or succeeding image field along the time axis in FIG. 3, i.e., pixel U(k−1, i, j), and a pixel that occupies the same spatial position in the image field of the right vertical array, i.e., pixel U(k+1, i, j). The luminance signal for a pixel, for example, is employed for U(k−1, i, j) and U(k+1, i, j). When the absolute value of the difference exceeds a predetermined value, it is ascertained that "there is motion across the pixels". When the absolute difference value does not exceed the predetermined value, it is ascertained that "the pixels are stationary". The evaluation is performed based on this result, and when it is ascertained that "there is motion across the pixels", or that "the pixels are stationary", the process corresponding to step S1 in the flowchart in FIG. 2 is performed, and the pixel motion flag is output to the line interpolator 4.

In FIGS. 3 to 6, the variable "k" represents time (order), k−1 denoting the (k−1)th field; k, the k-th field; and k+1, the (k+1)th field. The variable "i" represents the vertical spatial position in the same field, i−1 denoting the (i−1)th pixel from the top; i, the i-th pixel; and i+1, the (i+1)th pixel. Further, the variable "j" represents the horizontal spatial position in the same field. Since it is difficult to illustrate the horizontal state in FIGS. 3 to 6, for convenience sake, all the js are the same.

The MPEG2 motion vector data processor 3 receives the MPEG2 motion vector data from the MPEG2 decoder 1, and employs the data to prepare various other data called Motion data, Direction data and Size data.

The Motion data are one-bit data used to determine whether there is movement in an image. The Motion data are changed by the MB units, and are related to the magnitude [MV] of a motion vector MV. Assuming that the horizontal element of the motion vector is defined as MV1 and the vertical element is defined as MV2, and that the absolute value symbol is defined as [ ], the magnitude [MV] of the motion vector is represented by expression (1), $$[MV]=(MV1^2+MV2^2)^{1/2} \quad (1).$$

The Motion data are 1 when the image is stationary, or 0 when the image is moving. The MB is a 16×16 pixel block that serves as the detection unit for a motion vector.

The Direction data are one-bit data that represent the direction of movement in an image, and are changed by the MB unit. The direction of the motion vector is sorted to obtain the horizontal direction or the stationary state, and the vertical direction. When the direction of movement in an image is sorted and provides the horizontal direction or the stationary state, the Direction data are 1. When the direction of movement in an image is sorted and provides the vertical direction, the Direction data are 0.

The Size data, which are one-bit data used to determine whether there is a great amount of image motion in a picture, are changed by the picture unit. When there is little image motion in a picture, the Size data are 1. When there is a great amount of image motion in the picture, the Size data are 0. In this instance, "picture" represents an image field or an image frame.

The MPEG2 motion vector data processor 3 outputs, at the least, the Direction data and the Size data to the line interpolator 4.

The line interpolator 4 performs a predetermined process for an image based on steps S2 to S8 in the flowchart in FIG. 2.

First, a pixel motion flag E(i, j) for a target pixel is examined (step S2 in FIG. 2). When the pixel motion flag E(i, j)=1, it is ascertained that "there is no pixel motion", and the inter-field interpolation process at step S5 is performed.

FIG. 3 is a conceptual diagram for explaining the inter-field interpolation process. In this example, the preceding and succeeding image fields (e.g., the right and left arrays in FIG. 3) are employed to generate pixels in an image field located between them (the center array in FIG. 3).

Specifically, in the inter-field interpolation process at step S5, expression (2), $$\{U(k-1, i, j)+U(k+1, i, j)\}/2 \quad (2),$$

is employed to calculate the average value of a pixel in the image field of the left array, which is an adjacent image field along the time axis in FIG. 3, e.g., the i-th pixel U(k−1, i, j) from the top in the (k−1)th field, and a pixel that occupies the same spatial position in the image field of the right array, e.g., the i-th pixel U(k+1, i, j) from the top in the (k+1)th field.

The pixel that serves as the average value is interpolated as a pixel that occupies the spatial position in the center image field, which is located in the middle, between the preceding and the succeeding image fields, e.g., as the i-th pixel I(k, i, j) from the top in the k-th field. In this example, U(k−1, i, j) and U(k+1, i, j) are employed as the luminance signal and the color difference signal for pixels, and the interpolation is performed for each signal.

When at step S2 the pixel motion flag E(i, j)=0, the line interpolator 4 determines that "there is pixel motion", and program control moves to step S3 to make a predetermined decision. In accordance with the results, step S6 is performed.

Figure 4:
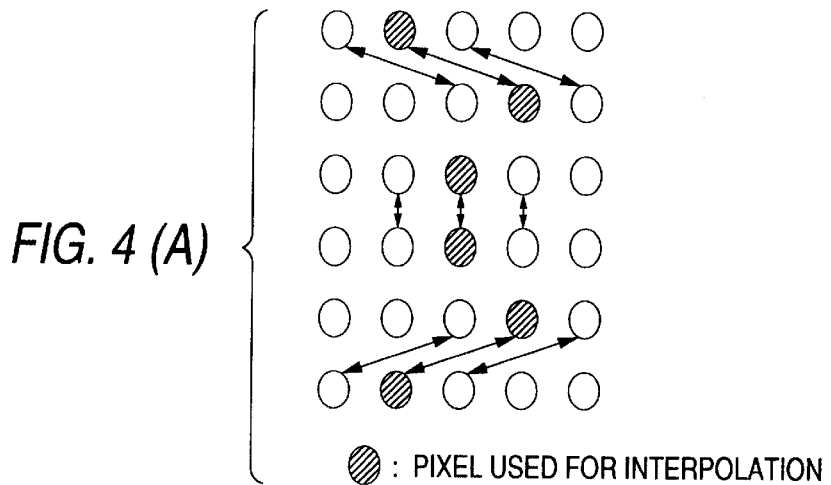
FIGS. 4(A) and 4(B) are conceptual diagrams for explaining the intra-field interpolation process performed by the line interpolation apparatus in FIG. 1.
Figure 4:
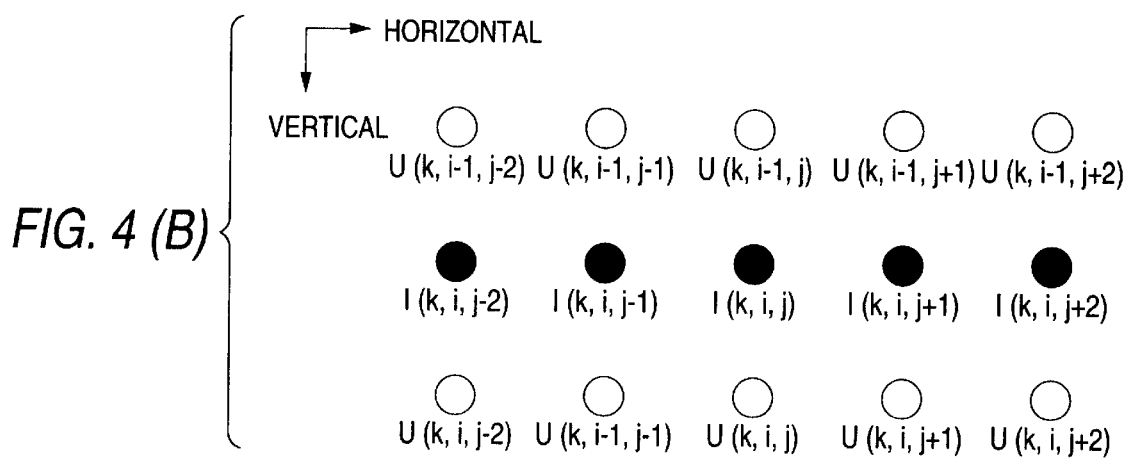

The processes at steps S3 and S6 will now be described while referring to FIGS. 4(A) and 4(B). FIGS. 4(A) and 4(B) are diagrams showing the same image field. The white dots and the hatched dots in FIG. 4(A) represent the pixels (luminance signals) that originally were present (transmitted by the MPEG2 decoder 1). The white dots U in FIG. 4 (B) represent pixels (luminance signals) that originally were present (transmitted by the MPEG2 decoder 1), while the Black dots I represent pixels (luminance signals) that were newly generated by the line interpolator 4 (which will be described later). At step S3, first, the correlation existing between each pixel (luminance signal) and a pixel in its vicinity is examined.

In this case, for individual pixels the following three correlations are examined. As the first correlation, which in FIG. 4(A) is indicated by arrows pointing down and to the right and extending from the topmost row to the second row, a difference is calculated between the luminance signal for a specific pixel and the luminance signal for a pixel located down and to the right. In this instance, the sum is obtained for the absolute values of the differences calculated for three horizontally arranged sequential pixels.

Assume that, by interpolation, a new pixel I(k, i, j) is to be generated at the center position in FIG. 4(B). When $D_a$(k, i, j) is defined as the sum of the absolute values of the differences (hereinafter referred to as an "absolute difference sum") for the first correlation, and [ ] is defined as an absolute value symbol, expression (3) is established by using the sum of the differences for pixels in the (i−1)th row and those down and to the right in the i-th row.

$$D_a(k, i, j)=[U(k, i-1, j-2)-U(k, i, j)]+[U(k, i-1, j-1)-U(k, i, j+1)]+[U(k, i-1, j)-U(k, i, j+2)] \quad (3).$$

Since the image field is the same in FIG. 4(B), the k that indicates the order of the fields in the time series is the same for all the pixels.

As the second correlation, as is indicated by vertical arrows between the third and fourth rows from the top in FIG. 4(A), a difference is calculated between the luminance signal for a specific pixel and the luminance for a pixel that is vertically arranged. Then, the sum of absolute difference values is obtained for three horizontally arranged sequential pixels.

Assume that, by interpolation, a new pixel I(k, i, j) is to be generated at the center location in FIG. 4(B). When $D_b$(k, i, j) is defined as an absolute difference sum that is the total of the absolute difference values for the second correlation, and [ ] is defined as an absolute value symbol, expression (4) is established by using the sum of the differences for pixels that are vertically arranged in the (i−1)th row and the i-th row.

$$D_b(k, i, j)=[U(k, i-1, j-1)-U(k, i, j-1)]+[U(k, i-1, j)-U(k, i, j)]+[U(k, i-1, j+1)-U(k, i, j+1)] \quad (4).$$

As the third correlation, as is indicated by arrows directed up and to the right between the fifth and sixth rows from the top in FIG. 4(A), a difference is calculated between the luminance signal for a specific pixel and the luminance signal for a pixel positioned up and to the right, and the sum of the absolute values of the differences is obtained for the three horizontally arranged sequential pixels.

Assume that, by interpolation, a new pixel I(k, i, j) is to be generated at the center position in FIG. 4(B). When $D_c$(k, i, j) is defined as the absolute difference sum, which is the total of absolute values of the differences for the second correlation, and [ ] is defined as an absolute value symbol, expression (5) is established by using the sum of the differences between the pixels in the (i−1)-th row and those up and to the right in the i-th row.

$$D_c(k, i, j)=[U(k, i-1, j)-U(k, i, j+2)]+[U(k, i-1, j+1)-U(k, i, j-1)]+[U(k, i-1, j+2)-U(k, i, j+2)] \quad (5).$$

Then, the obtained absolute difference value sums $D_a$(k, i, j), $D_b$(k, i, j) and $D_c$(k, i, j) are compared. When, as a result, $D_a$(k, i, j) is determined to be the minimum value, a check is performed to determine whether this value is greater than a predetermined reference value, and whether the Size data indicate a value of 1 (step S3).

If the decision is No, the intra-field interpolation process at step S6 is performed. That is, expression (6), $$\{U(k, i-1, j-1)+U(k, i, j+1)\}/2 \quad (6),$$

is employed to calculate the average value for the center pixel pair of the pixel pairs for which the differences were calculated in the direction extending down and to the right, e.g., the hatched pixels in the first and second rows in FIG. 4(A). Thereafter, the pixel having the average value is defined as I(k, i, j) by interpolation.

When, as the result of the comparison, $D_b$(k, i, j) is determined to be the minimum value, a check is performed to determine whether this value is greater than the predetermined reference value and whether the Size data indicate a value of 1 (step S3).

When the decision is No, the intra-field interpolation at step S6 is performed. That is, expression (7), $$\{U(k, i-1, j)+U(k, i, j)\}/2 \quad (7),$$

is employed to calculate the average value for the center pixel pair of the three pixel pairs for which the differences were calculated in the vertical direction, e.g., the hatched pixels in the third and fourth rows in FIG. 4(A). The pixel that has the average value is defined as I(k, i, j) by interpolation.

When, as the result of comparison, $D_c$(k, i, j) is determined to be the minimum value, a check is performed to determine whether this value is greater than the predetermined reference value and whether the Size data indicate a value of 1 (step S3).

When the decision is No, the intra-field interpolation at step S6 is performed. That is, expression (8), $$\{U(k, i-1, j+1)+U(k, i, j-1)\}/2 \quad (8),$$

is employed to calculate the average value for the center pixel pair of the three pixel pairs for which the differences were calculated in the direction extending up and to the right, e.g., the hatched pixels in the fifth and the sixth rows in FIG. 4(A). The pixel that has the average value is defined as I(k, i, j) by interpolation.

The above intra-field interpolation process is performed only for the luminance signals for pixels; and for color difference signals, only the value obtained in the vertical direction (a value obtained from expression (7)) is employed.

When the decision at step S3 is Yes, the determination process at step S4 is performed to suppress deterioration of the image quality due to the image flickering that may occur when the intra-field interpolation process at step S6 is employed. At step S4, a check is performed to determine whether the Direction data indicate a value of 1 (the horizontal direction or the still state). When the decision is Yes, it is ascertained that the motion in an image is horizontal or is halted. In this case, the intra-field and inter-field interpolation processes at step S7 are performed.

Figure 5:
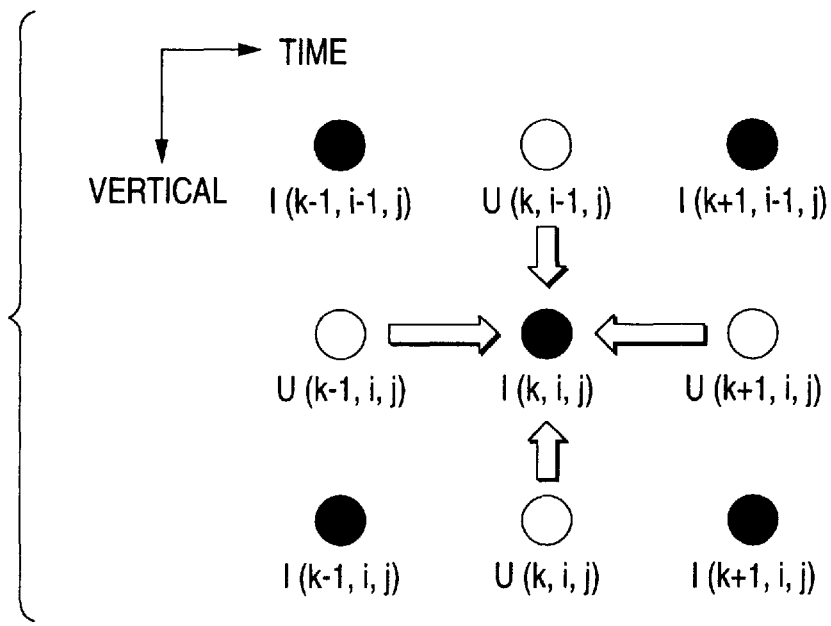
FIG. 5 is a conceptual diagram for explaining the intra-field and inter-field interpolation processes performed by the line interpolation apparatus in FIG. 1.

FIG. 5 is a conceptual diagram for explaining the method used for the intra-field and inter-field interpolation processes. As is shown in FIG. 5, pixels that in the preceding and succeeding image fields occupy the same spatial position as the interpolation pixel (I(k, i, j) in FIG. 5) that is generated by interpolation, e.g., pixels U(k−1, i, j) and U(k+1, i, j) in FIG. 5, and pixels that are vertically positioned in the same image field as the interpolation pixel, i.e., pixels U(k, i−1, j) and U(k, i, j) in FIG. 5, are employed in the intra-field and inter-field interpolation processes. The average pixel is calculated by using these pixels and expression (9), $$\{U(k-1, i, j)+U(k+1, i, j)+U(k, i-1, j)+U(k, i, j)\}/4 \quad (9).$$

The obtained average pixel is defined as interpolation pixel I(k, i, j).

The intra-field and inter-field interpolation processes are performed only for the luminance signals for pixels; and for color difference signals, only the vertically obtained values (U(k, i–1, j) and U(k, i, j)) are employed.

When the decision at step S4 is No, it is ascertained that the Direction data is 0 (vertical) and that there is vertical motion. In this case, the vertical intra-field interpolation process at step S8 is performed.

Figure 6:
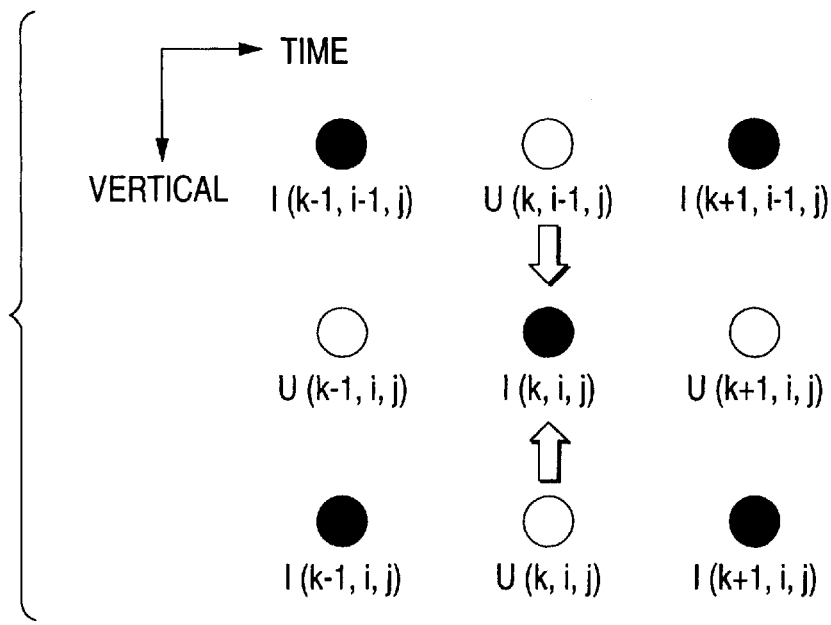
FIG. 6 is a conceptual diagram for explaining the intra-field interpolation process performed only in the vertical direction by the line interpolation apparatus in FIG. 1.

FIG. 6 is a conceptual diagram for explaining the method used for the vertical intra-field interpolation process. As is shown in FIG. 6, pixels that are vertically adjacent in the same image field as the interpolation pixel, e.g., pixels U(k, i–1, j) and U(k, i, j) in FIG. 5, are employed in the vertical intra-field interpolation process. The average pixel is calculated by using these pixels and expression (10), $$\{U(k, i-1, j)+U(k, i, j)\}/2 \tag{10}$$

The obtained average pixel is defined as the interpolation pixel I(k, i, j). The vertical intra-field interpolation process should be performed for both the luminance and the color difference signals for a pixel.

When the line interpolation apparatus 100 of the embodiment is used, motion vector data are employed in addition to the pixel motion detection process, so that data related to the direction and the magnitude of the motion across the entire image can be provided, and deterioration of the image quality due to interpolation can be prevented.

The invention is not limited to this embodiment, which is merely an example and has substantially the same arrangement as the technical idea described in the claims of the invention. Any modification that provides the same effects as the invention can be considered as being included within the technical scope of the invention.

In this embodiment the MPEG2 system is employed as an image compression type; however, the image compression type is not thereby limited, and other compression types may be employed. In short, all image compression types that include motion vector data related to movement in an image can be employed.

Further, in this embodiment DVD is employed as an input medium; however, the input medium type is not thereby limited, and other input media, such as digital broadcasting, may be employed. In short, all media can be employed for which image compression systems include motion vector data.

As is described above, according to the invention, since motion vector data are employed in addition to the detection of motion in pixels, data related to the direction and the magnitude of the motion across an entire image can be provided, and deterioration of the image quality due to interpolation can be prevented.

What is claimed is:

1. A line interpolation apparatus, which converts an interlaced scanning image signal into a progressive scanning image signal, comprising:
   a signal obtaining section adapted to obtain the interlaced scanning image signal by decoding a signal, for which image compression has been performed, using a motion vector that represents the direction and distance moved in an image; and
   a process determining section adapted to determine a line interpolation process by using both information obtained using the motion vector and information obtained by calculating differences between a pixel to be interpolated and pixels that, in image fields aligned with the time axis of and preceding and succeeding the image field in which the pixel to be interpolated is located, spatially occupy positions corresponding to that of the pixel to be interpolated; and
   a line interpolation section adapted to apply the line interpolation process determined by the process determining section to the interlaced scanning image signal obtained by the signal obtaining section.

2. The line interpolation apparatus according to claim 1, wherein, when a static state of the image is detected by the process determining section by using the information obtained from the differences between the pixels, the process determining section determines to use an inter-field interpolation process that generates a pixel in a middle image field located between the preceding and succeeding image fields,
   wherein, when a motion of the image is detected by the process determining section based on the information obtained from the differences, the process determining section obtains a minimum sum of absolute difference values in several directions by using pixels occupying positions in the same field and in the vicinity of the pixel that is to be interpolated; wherein, when the minimum sum is small, or when data obtained from the motion vector indicate that a movement of the image is extended, the process determining section determines to use an intra-field interpolation process that generates an interpolation using pixels in the same image field; wherein, when the minimum sum is large and the data obtained from the motion vector indicate that the image has been halted, or that the image has moved only a little, horizontally, the process determining section determines to use an intra-field and inter-field interpolation process that generates an interpolation pixel by using pixels in the same image field and pixels in both the preceding and succeeding image fields; wherein, when the minimum sum is large and the data obtained from the motion vector indicate that the image has moved only a little, vertically, the process determining section determines to use a vertical intra-field interpolation process that generates an interpolation pixel by using vertically arranged pixels in the same image field.

3. The line interpolation apparatus according to claim 2, wherein, in the inter-field interpolation process, an average pixel is calculated using pixels that occupy the same spatial positions in the preceding and succeeding image fields; and wherein the average pixel is defined as a pixel that occupies a spatial position in the middle image field between the preceding and succeeding image fields.

4. The line interpolation apparatus according to claim 2, wherein, during the performance of the intra-field interpolation process differences are obtained for pixels in the same image field, and an average pixel, which is calculated using pixels arranged in the direction in which the sum of absolute differences is the minimum, is defined as an interpolation pixel.

5. The line interpolation apparatus according to claim 2, wherein, during the intra-field and inter-field interpolation processes an average pixel, which is calculated using pixels whose spatial positions in the preceding and succeeding image fields are identical and pixels that are vertically adjacent in the same image fields, is defined as an interpolation pixel.

6. The line interpolation apparatus according to claim 2, wherein, during the vertical intra-field interpolation process an average pixel, which is calculated using vertically adjacent pixels in the same image field, is defined as an interpolation pixel.

7. The line interpolation apparatus according to claim 1, wherein an MPEG2 method is used to perform a compression process, and the data obtained from the motion vector constitute the motion vector data contained in an MPEG2 stream.

8. A line interpolation method, for converting an interlaced scanning image signal into a progressive scanning image signal, comprising:

obtaining the interlaced scanning image signal by decoding a signal for which image compression has been performed by using a motion vector to represent the direction and distance moved in an image;

determining a line interpolation process to be used by using both information obtained from the motion vector and information obtained from differences between a pixel to be interpolated and pixels that, in image fields aligned with the time axis of and preceding and succeeding the image field in which the pixel to be interpolated is located, spatially occupy positions corresponding to that of the pixel that is to be interpolated; and applying the line interpolation process to the interlaced scanning image signal.

9. The line interpolation method according to claim 8, wherein, when a static state of the image is detected by using the information obtained from the differences between the pixels, an inter-field interpolation process that generates a pixel in a middle image field located between the preceding and succeeding image fields, is determined to be used, wherein, when a motion of the image is detected based on the information obtained from the differences, a minimum sum of absolute difference values in several directions is obtained by using pixels occupying positions in the same field and in the vicinity of the pixel that is to be interpolated; wherein, when the minimum sum is small, or when data obtained from the motion vector indicate that a movement of the image is extended, an intra-field interpolation process that generates an interpolation using pixels in the same image field, is determined to be used;

wherein, when the minimum sum is large and the data obtained from the motion vector indicate that the image has been halted, or that the image has moved only a little, horizontally, an intra-field and inter-field interpolation process that generates an interpolation pixel by using pixels in the same image field and pixels in both the preceding and succeeding image fields, is determined to be used; wherein, when the minimum sum is large and the data obtained from the motion vector indicate that the image has moved only a little, vertically, a vertical intra-field interpolation process that generates an interpolation pixel by using vertically arranged pixels in the same image field, is determined to be used.

10. The line interpolation method according to claim 9, wherein, in the inter-field interpolation process, an average pixel is calculated using pixels that occupy the same spatial positions in the preceding and succeeding image fields; and wherein the average pixel is defined as a pixel that occupies a spatial position in the middle image field between the preceding and succeeding image fields.

11. The line interpolation method according to claim 9, wherein, during the performance of the intra-field interpolation process differences are obtained for pixels in the same image field, and an average pixel, which is calculated using pixels arranged in the direction in which the sum of absolute differences is the minimum, is defined as an interpolation pixel.

12. The line interpolation method according to claim 9, wherein, during the intra-field and inter-field interpolation processes an average pixel, which is calculated using pixels whose spatial positions in the preceding and succeeding image fields are identical and pixels that are vertically adjacent in the same image fields, is defined as an interpolation pixel.

13. The line interpolation method according to claim 9, wherein, during the vertical intra-field interpolation process an average pixel, which is calculated using vertically adjacent pixels in the same image field, is defined as an interpolation pixel.

14. The line interpolation method according to claim 9, wherein an MPEG2 method is used to perform a compression process, and the data obtained from the motion vector constitute the motion vector data contained in an MPEG2 stream.

15. A line interpolation apparatus which converts an interlaced scanning image signal into a progressive scanning image signal, comprising:

a signal obtaining section adapted to obtain the interlaced scanning image signal by decoding a signal by using a motion vector that represents the direction and distance moved in an image; and a process determining section adapted to determine a line interpolation process based on motion vector information and field pixel difference information.

16. The line interpolation apparatus according to claim 15, wherein, when a static state of the image is detected by the process determining section by using the pixel difference information, an inter-field interpolation process is performed to generate a pixel in the middle image field located between the preceding and succeeding image fields.

17. The line interpolation apparatus according to claim 16, wherein, when the motion of the image is detected by the process determining section based on the pixel difference information, a minimum sum of absolute difference values in several directions is obtained by using pixels occupying positions in the same field and in the vicinity of the pixel that is to be interpolated.

18. The line interpolation apparatus according to claim 17, wherein, when the minimum sum is small, or when the data obtained from the motion vector indicates that the movement of the image is extended, the process determining section determines to use an intra-field interpolation process that generates an interpolation pixel using pixels in the same image field.

19. The line interpolation apparatus according to claim 17, wherein, when the minimum sum is large and the data obtained from the motion vector indicates that the image has been halted, or that the image has moved slightly horizontally, the process determining section determines to use an intra-field and inter-field interpolation process that generates an interpolation pixel by using pixels in the same image field and pixels in both the preceding and succeeding image fields.

20. The line interpolation apparatus according to claim 17, wherein, when the minimum sum is large and the data obtained from the motion vector indicate that the image has moved slightly vertically, the process determining section determines to use a vertical intra-field interpolation process that generates an interpolation pixel by using vertically arranged pixels in the same image field.

21. The line interpolation apparatus according to claim 16, wherein, in the inter-field interpolation process, an average pixel is calculated using pixels that occupy the same spatial positions in the preceding and succeeding image fields; and wherein the average pixel is defined as a pixel that occupies a spatial position in the middle image field between preceding and succeeding image fields.

22. The line interpolation apparatus according to claim 18, wherein, during the performance of the intra-field interpolation process differences are obtained for pixels in the same image field, and an average pixel, which is calculated using pixel arranged in the direction in which the sum of absolute differences is the minimum, is defined as an interpolation pixel.

23. The line interpolation apparatus according to claim 19, wherein, during the intra-field and inter-field interpolation processes an average pixel, which is calculated using pixels whose spatial positions in the preceding and succeeding image fields are identical and pixels that are vertically adjacent in the same image fields, is defined as an interpolation pixel.

24. The line interpolation apparatus according to claim 20, wherein, during the vertical intra-field interpolation process an average pixel, which is calculated using vertically adjacent pixels in the same image field, is defined as an interpolation pixel.

25. The line interpolation apparatus according to claim 15, wherein an MPEG2 method is used to perform a compression process, and the data obtained from the motion vector constitute the motion vector data contained in an MPEG2 stream.

* * * * *